(12) United States Patent
Kalman

(10) Patent No.: US 10,618,679 B2
(45) Date of Patent: Apr. 14, 2020

(54) SOLAR PANEL HINGE RELEASE MECHANISM

(71) Applicant: Andrew E Kalman, San Francisco, CA (US)

(72) Inventor: Andrew E Kalman, San Francisco, CA (US)

( * ) Notice: Subject to any disclaimer, the term of this patent is extended or adjusted under 35 U.S.C. 154(b) by 318 days.

(21) Appl. No.: 15/671,790

(22) Filed: Aug. 8, 2017

(65) Prior Publication Data

US 2018/0037341 A1 Feb. 8, 2018

Related U.S. Application Data

(60) Provisional application No. 62/371,968, filed on Aug. 8, 2016.

(51) Int. Cl.
*B64G 1/44* (2006.01)
*B64G 1/22* (2006.01)

(52) U.S. Cl.
CPC ............. *B64G 1/443* (2013.01); *B64G 1/222* (2013.01)

(58) Field of Classification Search
CPC ........ B64G 1/222; B64G 1/443; B64G 1/503; H02S 20/00; H02S 30/00; H02S 30/10; H02S 30/20
USPC ............ 136/243, 244, 245; 244/172.6, 172.7
See application file for complete search history.

(56) References Cited

U.S. PATENT DOCUMENTS 5,037,043 A * 8/1991 Roth ...................... B64G 1/222
 136/245
5,400,987 A * 3/1995 Ziavras .................. B64G 1/222
 244/172.6

* cited by examiner

*Primary Examiner* — Nicholas McFall
*Assistant Examiner* — Terri L Filosi
(74) *Attorney, Agent, or Firm* — Donald R. Boys; Central Coast Patent Agency LLC

(57) ABSTRACT

A deployment system for solar panels has the panels spring loaded to deploy, but held folded against a satellite framework, held folded by trigger bars engaging slots or notches in hinge bodies holding the solar panels. A remotely-operable linear actuator moves the trigger bars to disengage the trigger bars to release the panels to deploy.

4 Claims, 6 Drawing Sheets

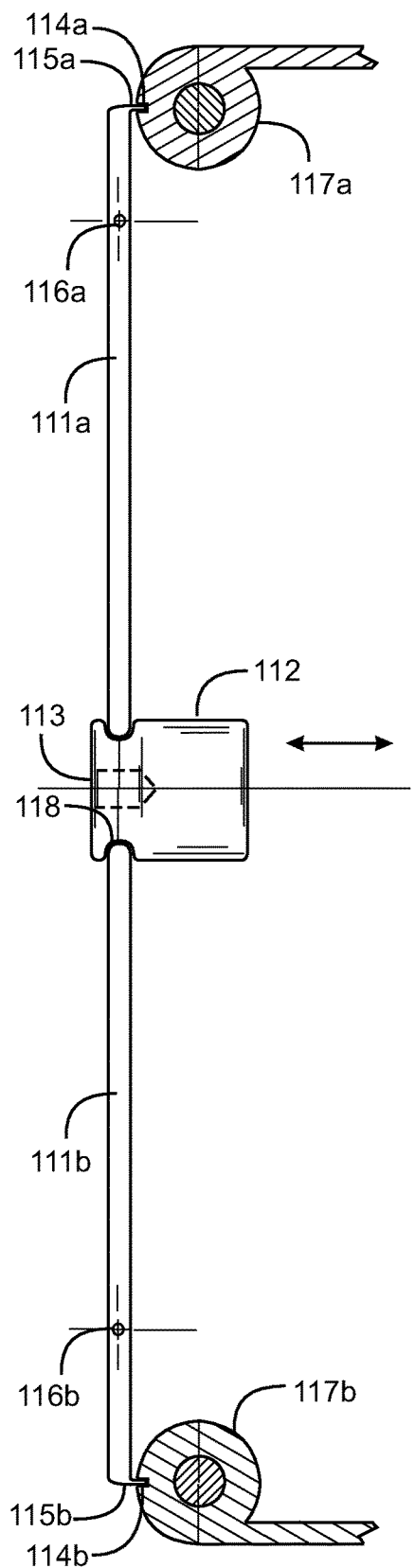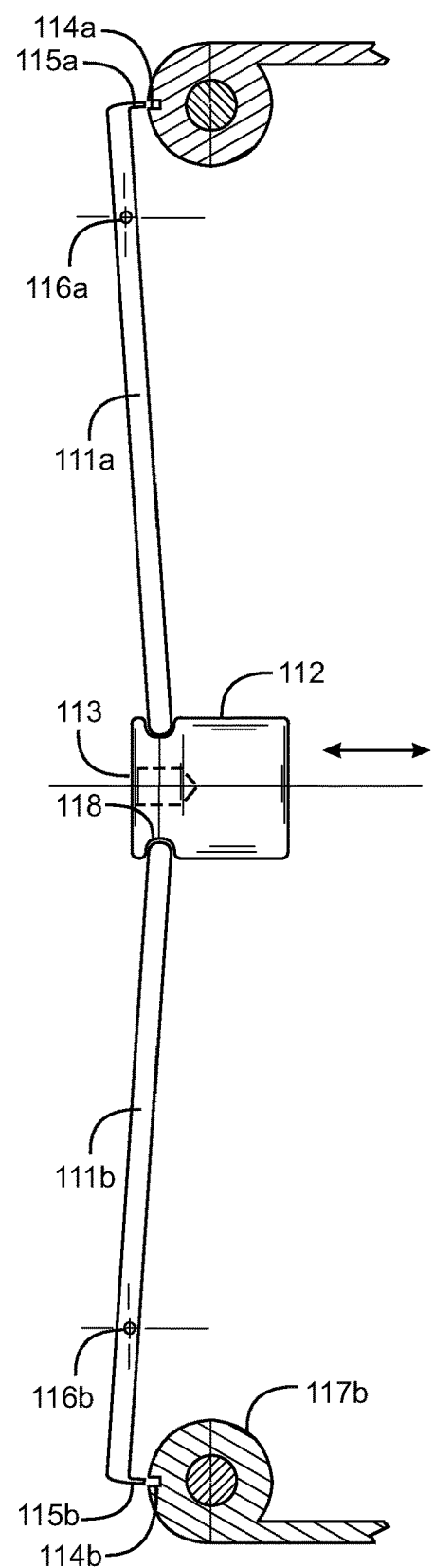
*Fig. 4A*  *Fig. 4B*

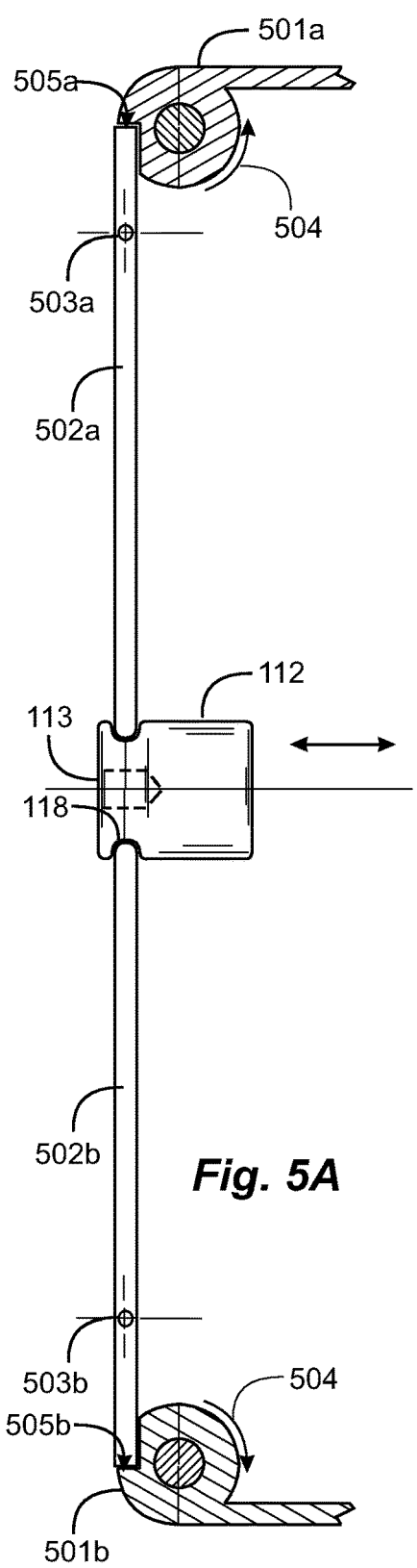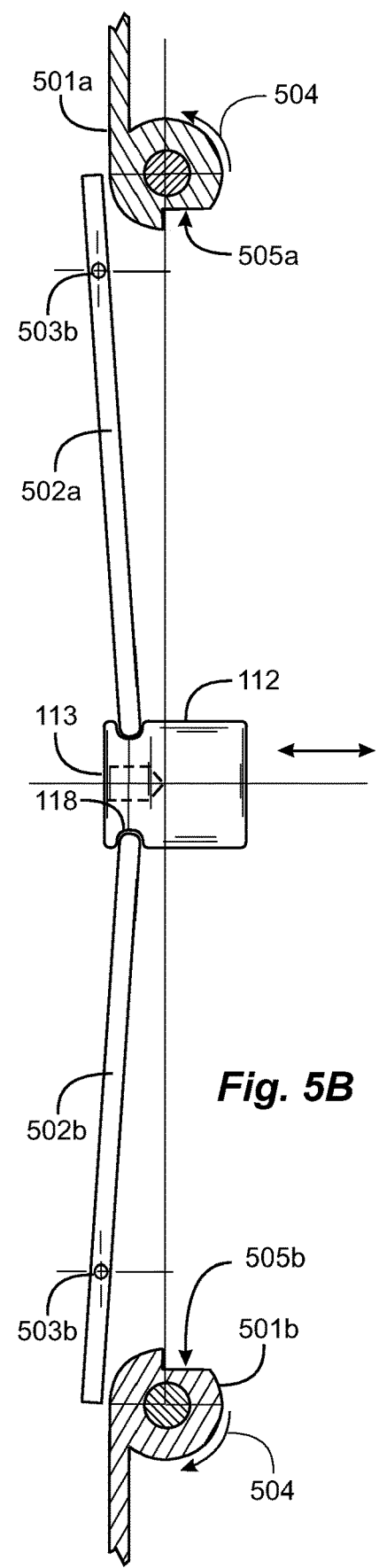
Fig. 5A
Fig. 5B

SOLAR PANEL HINGE RELEASE MECHANISM

CROSS-REFERENCE TO RELATED DOCUMENTS

The present invention claims priority to a U.S. provisional patent application 62/371,968, filed on Aug. 8, 2016, disclosure of which is incorporated herein at least by reference.

BACKGROUND OF THE INVENTION

1. Field of the Invention

The present invention is in the technology area of solar panel arrays, and pertains particularly to methods and apparatus for deploying solar panels.

2. Discussion of the State of the Art

Satellite technology is continually evolving, and one arguably important challenge is to provide mechanisms that will reliably activate and function without failure. Current mechanisms in the art are prone to failure in the field, requiring extensive investment in quality assurance and repeated testing under extreme conditions before release of such mechanism for use on a space craft or satellite.

Satellites may include large area solar panel arrays to power various functions of the satellite. A common device for releasing solar panels to be deployed is called a "burn-wire" mechanism. A burn wire requires a consistent electrical current to enable it to burn through a tether or tie-down cable to release a deployable mechanical feature such as a solar panel. Such mechanisms are used in small satellites and have, in practice, been unreliable. A mechanism that uses consumables, such as a release cord, may take more time to reset and therefore may also not be particularly efficient to test.

Therefore, what is clearly needed is a release mechanism that is extremely reliable, simple in execution, and trivially resettable.

BRIEF SUMMARY OF THE INVENTION

In one embodiment of the invention a deployment system for solar panels is provided, comprising a satellite framework, a first solar panel mounted to a first hinge body mounted along a first edge of a first side in a first plane of the satellite framework, the first hinge body rotatable around a first hinge axis parallel to the first edge, between a first position folded against the first side of the satellite framework, and a second, fixed position with the solar panel deployed away from the first side, the hinge body urged by a rotary spring mechanism to move the solar panel toward the second position, a slot or notch in the hinge body, the slot or notch having a depth into the hinge body toward the hinge axis, a first longitudinal trigger bar having a length at a right angle to the pivot axis of the hinge body, the trigger bar lying along an end of the satellite framework in a plane at a right angle to the plane of the first side, the trigger bar having an engagement end configured to engage the slot or notch in the hinge body, a pivot axis mounted to the end of the satellite framework, parallel to the hinge axis, the pivot axis engaging the trigger bar to rotate in a manner to move the engagement end into and out of the slot or notch in the hinge body, and a linear actuator engaging the trigger bar at an end opposite the engagement end, the linear actuator remotely operable in a first direction orthogonal to the plane of the end of the satellite framework, to move engagement of the trigger bar away from the slot or notch in the hinge body.

With the solar panel rotated against the spring force of the rotary spring mechanism to lie alongside and parallel to the first side of the satellite framework, and the linear actuator manually translated to rotate the trigger bar to engage the slot or notch in the hinge body, the solar panel is held by the trigger bar in the folded position against the first side of the satellite framework, and remotely triggering the linear actuator withdraws the engagement end of the trigger bar from the slot or notch in the hinge body, and allows the solar panel, urged by the rotary spring mechanism, to deploy to the second position.

In one embodiment, the system further comprises a second solar panel mounted to lie against a second side of the satellite framework opposite and parallel to the first side, with a hinge body with a slot or notch, and a second trigger bar engaging the slot or notch at one end, and engaging the linear actuator at an opposite end, such that the one linear actuator operates both trigger bars, and both solar panels may be folded and held against the satellite framework, and may be triggered to deploy together by remotely actuating the liner actuator. Also in one embodiment the system further comprises third and fourth solar panels implemented on third and fourth sides of the satellite framework, along opposite edges of the end, comprising third and fourth trigger bars all engaging the one linear actuator, such that all four solar panels may be folded and may be deployed together by remotely triggering the linear actuator.

In one embodiment the system further comprises third and fourth solar panels implemented on third and fourth sides of the satellite framework, along opposite edges of the end, spring actuated, wherein the first and second solar panels have retainer panels at right angles to long edges, such that the third and fourth solar panels, folded against the third and fourth sides of the satellite framework, are held folded by the retainer panels of the first and second solar panels with the first and second solar panels folded after the third and fourth, comprising just two trigger bars, wherein releasing the first and second solar panels to deploy, releases the third and fourth solar panels after the first and second have moved a specific arc.

BRIEF DESCRIPTION OF THE SEVERAL VIEWS OF THE DRAWINGS

FIG. 4A is a partial view of elements of the panel release mechanism of FIG. 3, with the release mechanism engaged.

FIG. 4B is the partial view of FIG. 4A with the release mechanism disengaged.

FIG. 5A is a partial view of elements of the panel release mechanism of FIG. 3, in an alternative embodiment, with the release mechanism engaged.

FIG. 5B is the partial view of FIG. 5A with the release mechanism disengaged.

DETAILED DESCRIPTION OF THE INVENTION

In various embodiments described in enabling detail herein, the inventor provides a unique mechanism for releasing solar panel wings on a space craft or satellite. The present invention is described using the following examples, which may describe more than one relevant embodiment falling within the scope of the invention.

Figure 1:
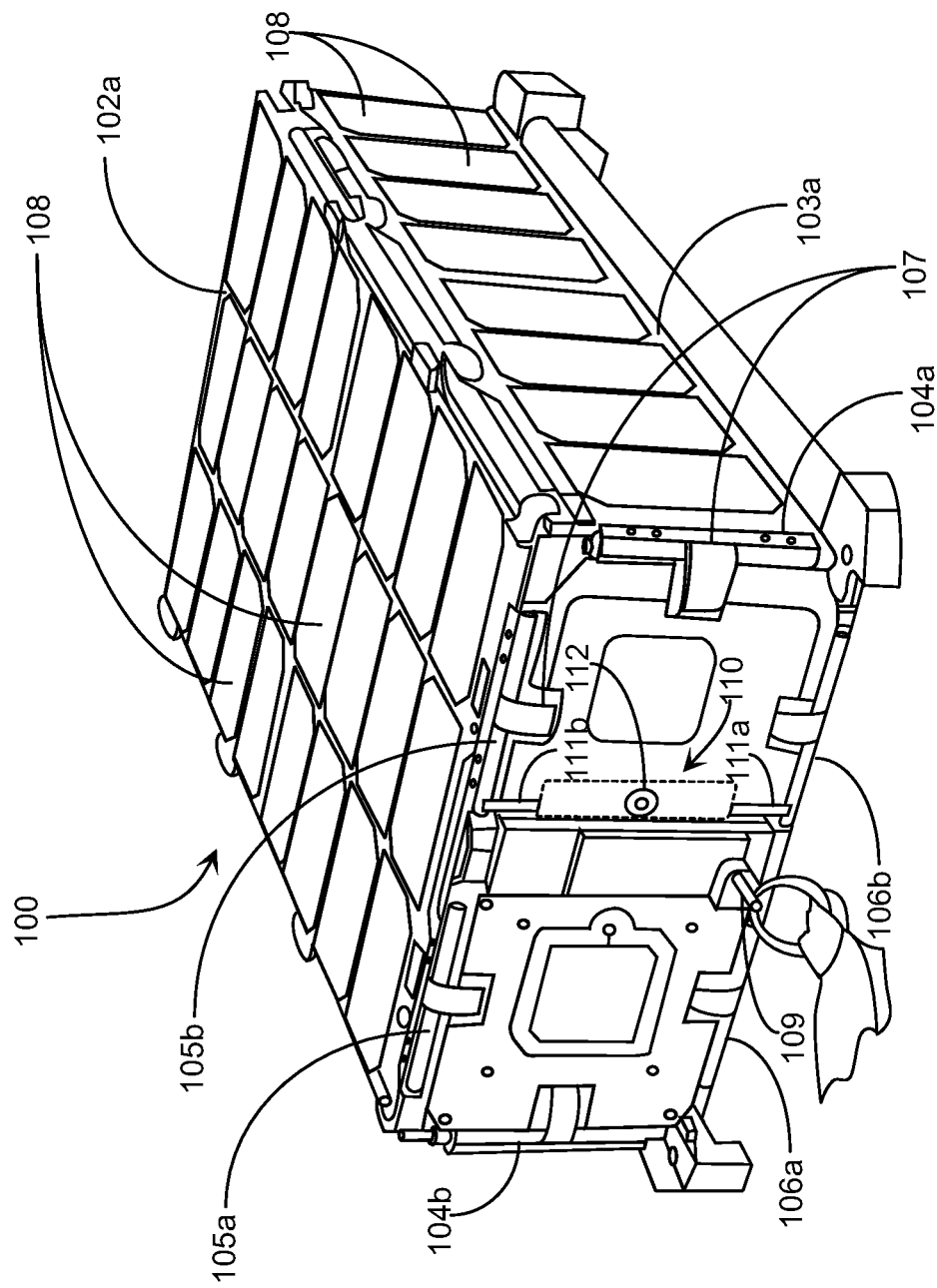
FIG. 1 is a perspective view of a satellite with solar panels in an embodiment of the presentment invention.

FIG. 1 is a perspective view of a satellite 100 with solar panels in a folded state of retention from deployment according to an embodiment of the presentment invention. Satellite 100 has a rectangular box structure in this example, that supports four deployable solar panels, two of which are visible in this view. These are solar panel 102a covering the top of the rectangular structure with panel 102b (not visible here) covering the bottom surface of the rectangular structure, and solar panel 103a covering the face seen to the right of the rectangular structure with panel 103b (not visible) covering the opposite side face of the rectangular structure. Each solar panel is covered with solar collector cells 108 symmetrically arranged and electrically connected through a hinge structure to system bus strips 107, enabling the panels to power circuitry within the structure of the satellite.

Solar panels 102a and 103a, and their counterparts on the bottom and opposite side, are attached to the rectangular structure using spring-loaded hinges. Solar panel 102a is attached to a hinge 105a, and a hinge 105b. Its counterpart panel 102b (not visible) is attached using a hinge 106a and a hinge 106b. All of the hinges are spring-loaded to rotate connected panels out from the underlying structure. Therefore, all of the solar panels must be physically held in a folded state of non-deployment, against the spring tension, until an event triggers release of the panels, which may be released by separate mechanisms at different times.

In this implementation of the invention an electromechanical release mechanism 110 is provided and incorporated that releases at least two of the solar panels, in this example, from a stowed position. In embodiments of the invention, considering just one hinge and one solar panel, the panel is connected to the framework by a spring-loaded hinge, in which the spring tension is applied to a hinge element to fold the solar panel against a side of the satellite framework. A trigger bar is pivoted around an axis parallel to a side of the framework, and is engaged with a slot or notch in the hinge element to hold the solar panel folded against the framework. The trigger bar is rotatable about the pivot axis to engage and disengage the slot or notch in the hinge element, to release the solar panel to deploy by the spring force, or to engage and hold the solar panel against the framework. The engagement and disengagement of the trigger bar is implemented by a translatable element at the end of the trigger bar, opposite the end that engages the hinge element. Detail of embodiments of this mechanism is provided in descriptions below.

In practical embodiments of the invention, there are two trigger bars interacting with hinges on opposite sides of the framework, holding and releasing panels on opposite sides of the framework. Trigger bars 111a and 111b are pivoted on axes parallel to the front end of the framework, and are activated by a linear actuator 112, visible as an annular feature at roughly a center point of mechanism 110. Actuator 112 moves perpendicularly to the front face of the structure, and is pulled out against spring force to lock the trigger bars into slots or notches in each hinge provided therein for the purpose. An electric signal may release puller 112 to cause it to translate to release the hinges to rotate the panels by the spring tension. The mechanism is manually resettable using a male threaded puller key depicted herein as a key 109. Key 109 may be threaded into a central opening having matching female threads on device 112. In this example, key 109 is stowed into a holding seat.

In one implementation, solar panels 102a and the opposite panel 102b are operated for hinge release, and may be re-armed using mechanism 112. In one embodiment, solar panel 103a and the opposite solar panel 103b are connected to passive hinges that are not controlled by a solar panel release mechanism such as mechanism 112. Solar panel 103a and the opposite panel 103b, in this embodiment, each include at least one clasp or grabber panel that fits over the edge of, or otherwise prevents solar panel 103a and the opposite panel 103b (smaller side panels) from swinging out before the larger panels are released, and are in the process of swinging out past at least degrees along a swing arc. Therefore, the trigger bars constrain the two larger solar panels directly, wherein the smaller panels are passive and released only once the larger solar panels are released. In an alternative embodiment, a trigger-bar mechanism may be used to separately release the smaller panels.

Figure 2:
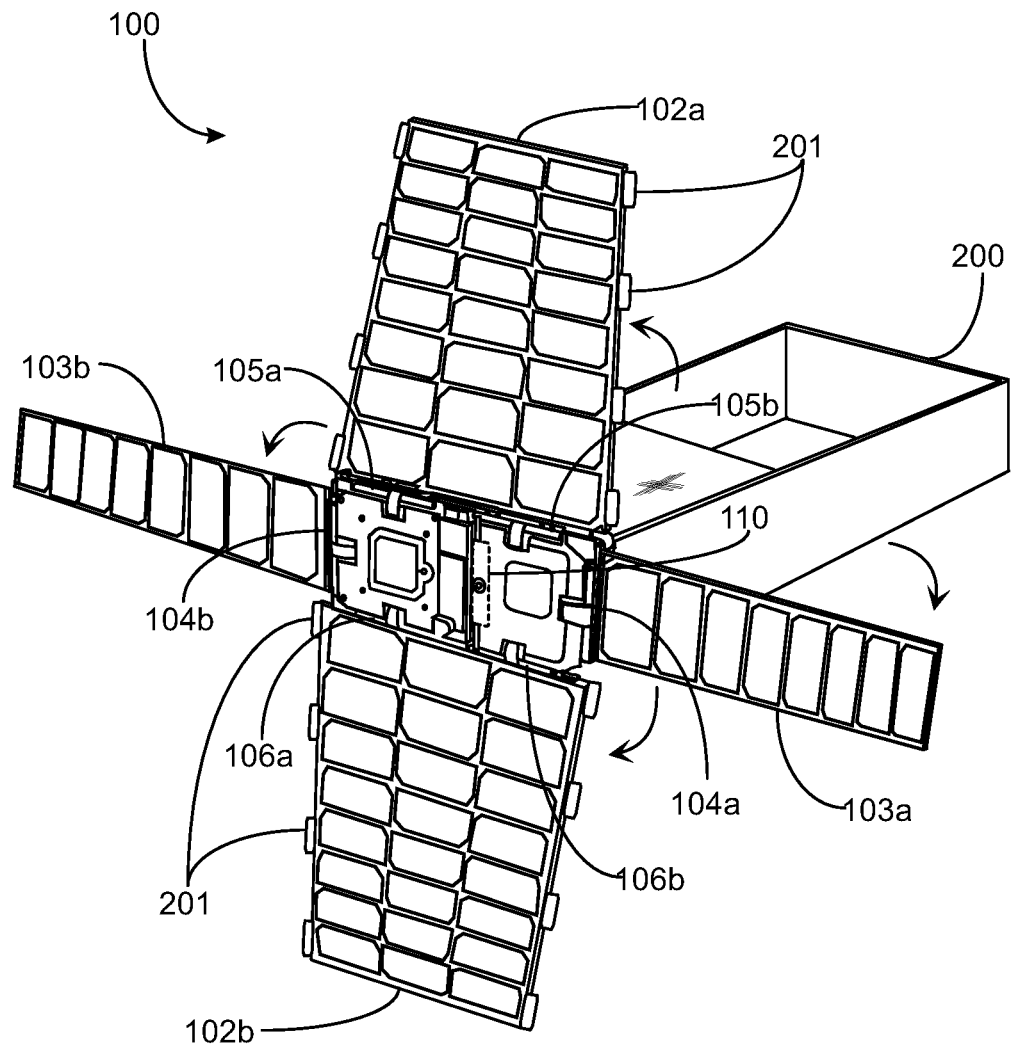
FIG. 2 is a perspective view of the satellite of FIG. 1 in operation with solar panels released and deployed.

FIG. 2 is a perspective view of satellite 100 of FIG. 1 with all four solar panels released and deployed. The electromechanical release mechanism 110 enables release of solar panels 102a and 102b depicted in a state of deployment. Actuator 112 has two positions, these being armed (pulled out and cocked), and released (disarmed), which may be triggered by electrical signal. Once released, the actuator remains in that state until mechanical force enabled by threaded tool 109 of FIG. 1. is used to pull it back out to the armed state. The release process resulting from electrical charge is on the order of milliseconds.

To re-arm satellite 100, the side panels 103a and 103b are urged back against spring tension against the frame 200, and subsequently the larger panels are urged down against the frame. Solar panels 102a and 102b in this example have retention panels 201 that may be set such that when closed over the smaller side panels the protrusions retention panels prevent the smaller panels from deploying until the larger panels are rotated out some degree along the arcuate paths of the deployment, such as for example 10 degrees, whereas the full deployment angle may be 90 degrees from 5 base. In this implementation, only a single solar panel release mechanism is necessary to deploy all four panels. However, there may be more than one release mechanism used on one vehicle without departing from the spirit and scope of the present invention.

Figure 3:
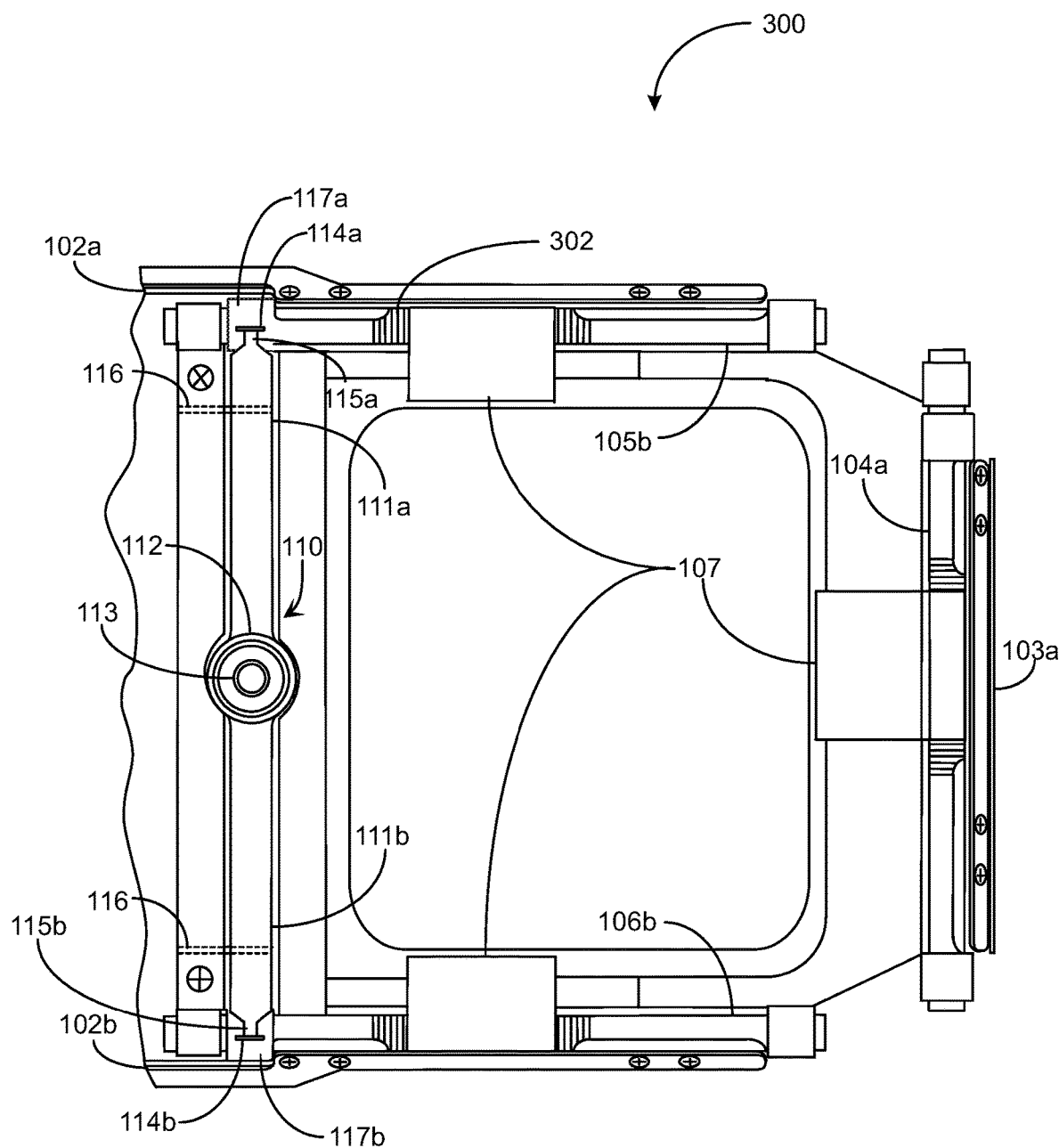
FIG. 3 is an enlarged elevation view of a portion of the front face of a frame of the satellite of FIG. 2, depicting a solar panel release mechanism according to an embodiment of the present invention.

FIG. 3 is an enlarged elevation view 300 of a portion of the front face of satellite frame 200 of FIG. 2 depicting solar panel release mechanism 110 according to one embodiment of the present invention. View 300 depicts a portion of the front face of frame 200 with a cover plate removed to reveal the entire solar panel release mechanism 110. Hinges 105b, 106a, and hinge 104a are spring loaded about their rotation axes with a torsion spring 302 installed on each hinge. The springs exert rotational torque to cause panel deployment out to approximately 90 degrees when released. Bus power strips 107 connect the solar panels to satellite circuitry.

In this implementation, trigger bar 111a includes an end 115a engaged in a slot or notch 114a machined into the body of hinge 105b that connects solar panel 102a to the satellite frame. The state of engagement indicates that solar panel 102a is locked into its folded position. Trigger bar 111b included an end 115*b* engaged in a slot or notch 114*b* in hinge 106*b*. In practice, both trigger bars will either be engaged in their respective notches (armed) or not engaged with the hinges (post release). The solar panels are shown in the stowed position. In one embodiment actuator 112 includes a cylinder having a radial groove, into which proximal ends of each trigger bar may engage.

When actuator 112 is activated, each trigger bar rotates about fulcrum pin 116 located near the engagement and anchored in adjacent structure. In the implementation depicted above, the mechanical advantage is approximately 8:1. Release mechanism 110 includes a small threaded annular seat 113 to enable the threaded installation of a key (T-handle tool) which may be used to manually pull the actuator outwards to rearm it. It may be noted herein that the actuator may only be rearmed when the solar panels are in the stowed position. End 115 may release from slot or notch 114 only when actuator mechanism 112 has fired, and may engage only when actuator 112 has been rearmed. Hinge 104*a* connected to solar panel 103*a* is a passive hinge, in this embodiment, that may be held in place against the frame by one or more clasps or grabbers 201 installed along the adjoining edge of the top panel 102*a*. It is noted herein that while multiple hinges may be used on each solar panel not all hinges require adaptation to the solar panel release mechanism.

FIG. 4A is a partial view of elements of the panel release mechanism of FIG. 3, with the release mechanism engaged. Actuator 112 is seen in side view, having a groove 118 that engages both trigger bars 111*a* and 111*b*. Trigger bar 111*a* pivots on axis 116*a*, and trigger bar 111*b* pivots on axis 116*b*.

In FIG. 4A the mechanism is engaged, with ends 115*a* and 115*b* engaged in slots 114*a* and 114*b*, constraining hinge elements 117*a* and 117*b* from rotation to deploy the solar panels. In this orientation, the trigger bars are substantially vertical.

In operation, to release and deploy the solar panels, actuator 112 is translated, in this representation, to the right, by enough to disengage ends 115*a* and 115*b* from respective slots 114*a* and 114*b* in hinge portions 117*a* and 117*b* respectively. This operation is may be implemented in different embodiments in different ways. It is important that the movement of actuator mechanism 112 be remotely activated by a timer or a radio signal, because, in final use, the satellite is in orbit, and deploying the solar panels is a part of the process of placing the satellite in operation. The mechanism to translate actuator mechanism 112 may be a solenoid, for example, triggered by a signal from a control system, not shown, in the satellite, in response to a timer or radio signal.

FIG. 4B is the partial view of FIG. 4A with the release mechanism disengaged, and illustrates the movement of actuator mechanism 112 needed to release and deploy the solar panels.

FIG. 5A is a partial view of elements of the panel release mechanism of FIG. 3, in an alternative embodiment, with the release mechanism engaged. A significant difference in this embodiment, is that the hinges have a notch, rather than a slot, and the trigger bars have a square end that engages the notch such that force of the hinge, from the hinge spring, is applied directly along the length of the trigger bar, rather than in shear across a right-angle extension of the trigger bar as shown in FIG. 4A. This arrangement provides a sturdier, more fasil-proof system than that shown in FIGS. 4A and 4B.

In FIG. 5A, hinge element 501*a* has a notch 505*a* that engages a blunt, square end of trigger bar 502*a*. Hinge element 501*b* has a notch 505*b* that engages trigger bar 502*b*. Both trigger bars engage actuator 112. Arrows 504 indicate rotational direction of applied force on hinge elements 501*a* and 501*b*. Trigger bar 502*a* pivots on axis 503*a* and trigger bar 502*b* pivots on axis 503*b*.

FIG. 5B is the partial view of FIG. 5A with the release mechanism disengaged, showing hinge elements 501*a* and 501*b* rotated to the deployed position, which is about ninety degrees in this embodiment, from the folded position.

Figure 6:
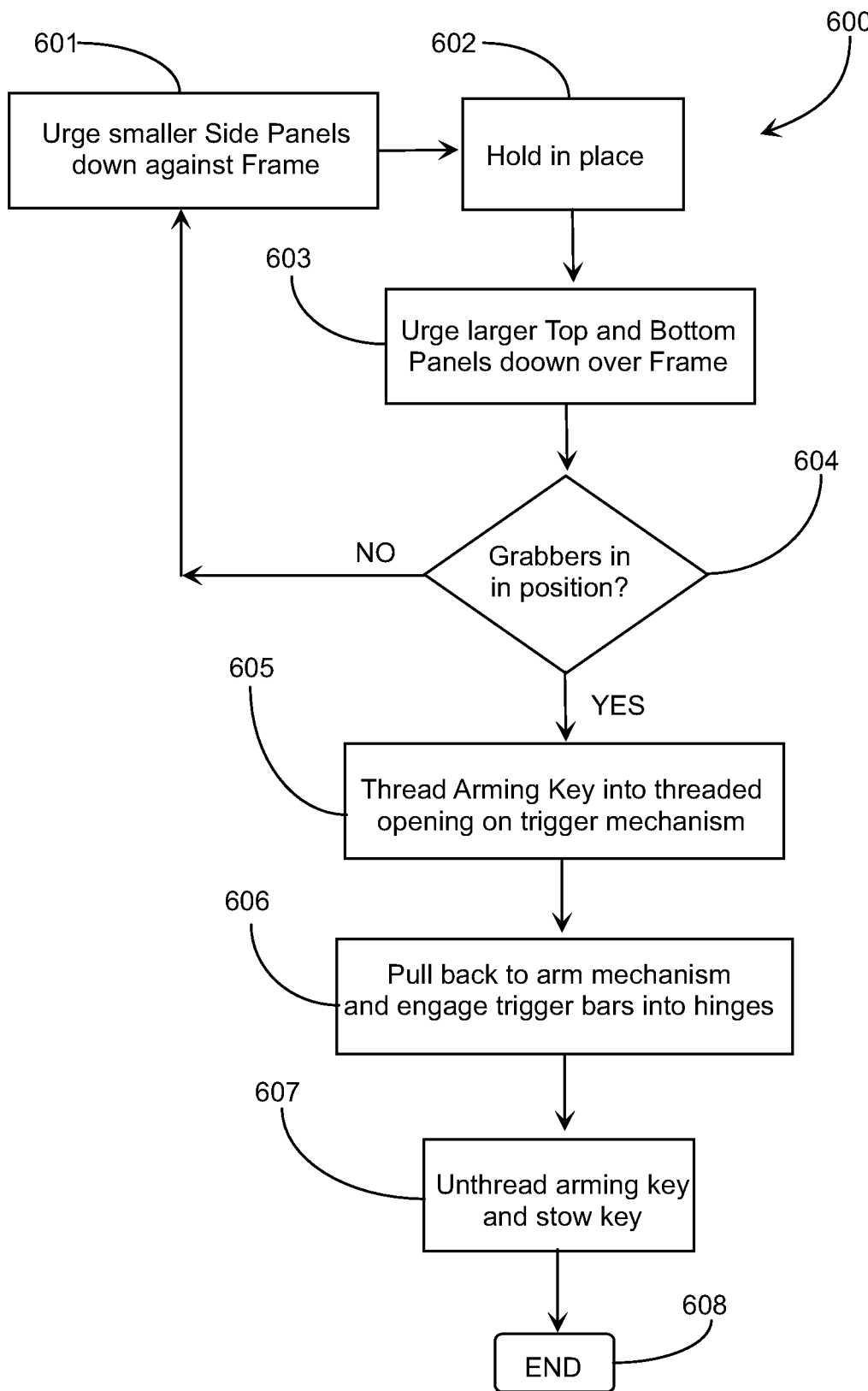
FIG. 6 is a process flow chart depicting steps for arming the solar power release mechanism of FIG. 3.

FIG. 6 is a process flow chart 600 depicting steps for arming the solar power release mechanism of FIG. 3. It is presumed in this embodiment that the vehicle to which this process applies is at least similar in design to satellite 100 depicted in FIG. 1 and in FIG. 2 of this application. At step 601, a user may urge the smaller side solar panels down against the satellite frame against torsion spring stored mechanical energy. At step 602, the user continues to hold the side panels down while at step 603 the user urges the larger top and bottom solar panels down against the frame. The top and bottom panels have grabbers or stops on both lateral edges that overlap the edges of the smaller panels so that the top panels are down against the frame and the smaller panels no longer need to be held down physically by the user, as long as the user simply holds the top and bottom panels down over or against the satellite frame.

The user may check and make a determination in step 604 as to whether or not the grabbers are in position blocking the smaller panels from swinging out from the frame under spring tension. If at step 604, it is determined by the user that the grabbers are not in position to block swing-out of the smaller panels then the process may resolve back to step 601. If at step 604, the grabbers are in place and blocking swing out of the smaller panels, the user may, while holding down only the top and bottom panels, thread an arming key or tool into a threaded opening provided on the pin puller mechanism (trigger) at step 605. At step 606, the user may pull back the actuator against spring tension to engage the trigger bars into the respective notches or slots provided on the interfacing hinge bodies. The user may then remove the arming key from the threaded opening provided at substantial center on the actuator mechanism, and may stow the key at a convenient location on the satellite at step 607. The process may end for arming at step 608.

It will be apparent to one with skill in the art that the trigger system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented within the scope of the invention. The invention is limited only by the breadth of the claims below.

The invention claimed is:

1. A deployment system for solar panels, comprising:
a satellite framework;

a first solar panel mounted to a first hinge body mounted along a first edge of a first side in a first plane of the satellite framework, the first hinge body rotatable around a first hinge axis parallel to the first edge, between a first position folded against the first side of the satellite framework, and a second, fixed position with the first solar panel deployed away from the first side, the first hinge body urged by a rotary spring mechanism to move the first solar panel toward the second position;

a slot or notch in the first hinge body, the slot or notch having a depth into the first hinge body toward the first hinge axis;

a first longitudinal trigger bar having a length at a right angle to the pivot axis of the first hinge body, the first trigger bar lying along an end of the satellite framework in a plane at a right angle to the first side, the first trigger bar having an engagement end configured to engage the slot or notch in the first hinge body;

a pivot axis mounted to the satellite framework, parallel to the first hinge axis, the pivot axis engaging the first trigger bar to rotate in a manner to move the engagement end into and out of the slot or notch in the first hinge body; and a linear actuator engaging the first trigger bar at an end opposite the first engagement end, the linear actuator remotely operable in a first direction orthogonal to the satellite framework, to move engagement of the first trigger bar away from the slot or notch in the first hinge body;

wherein, with the first solar panel rotated against the spring force of the rotary spring mechanism to lie alongside and parallel to the first side of the satellite framework, and the linear actuator translated to rotate the first trigger bar to engage the slot or notch in the first hinge body, the first solar panel is held by the first trigger bar in the folded first position against the first side of the satellite framework, and remotely triggering the linear actuator withdraws the engagement end of the first trigger bar from the slot or notch in the first hinge body, and allows the first solar panel, urged by the rotary spring mechanism, to deploy to the second position.

2. The deployment system of claim 1, further comprising a second solar panel mounted to lie against a second side of the satellite framework opposite and parallel to the first side, with a hinge body with a slot or notch, and a second trigger bar engaging the slot or notch at one end, and engaging the linear actuator at an opposite end, such that the one linear actuator operates both trigger bars, and both solar panels may be folded and held against the satellite framework, and may be triggered to deploy together by remotely actuating the liner actuator.

3. The deployment system of claim 2, further comprising third and fourth solar panels implemented on third and fourth sides of the satellite framework, along opposite edges, comprising third and fourth trigger bars all engaging the one linear actuator, such that all four solar panels may be folded and may be deployed together by remotely triggering the linear actuator.

4. The deployment system of claim 2 further comprising third and fourth solar panels implemented on third and fourth sides of the satellite framework, along opposite edges, spring actuated, wherein the first and second solar panels have retainer panels at right angles to long edges, such that the third and fourth solar panels, folded against the third and fourth sides of the satellite framework, are held folded by the retainer panels of the first and second solar panels with the first and second solar panels folded after the third and fourth, comprising just two trigger bars, wherein releasing the first and second solar panels to deploy, releases the third and fourth solar panels after the first and second have moved a specific arc.

\* \* \* \* \*